(12) United States Patent  (10) Patent No.: US 9,038,050 B2
Crespi et al.  (45) Date of Patent: May 19, 2015

(54) LOW OR MEDIUM VOLTAGE ELECTRIC POWER DISTRIBUTION NETWORK

(75) Inventors: Andrea Crespi, Gallarate (IT); Massimo Scarpellini, Dalmine (IT)

(73) Assignee: ABB Technology AG, Zurich (CH)

( * ) Notice: Subject to any disclaimer, the term of this patent is extended or adjusted under 35 U.S.C. 154(b) by 64 days.

(21) Appl. No.: 13/823,462

(22) PCT Filed: Aug. 17, 2011

(86) PCT No.: PCT/EP2011/064175
§ 371 (c)(1),
(2), (4) Date: Mar. 14, 2013

(87) PCT Pub. No.: WO2012/034814
PCT Pub. Date: Mar. 22, 2012

(65) Prior Publication Data
US 2013/0179873 A1 Jul. 11, 2013

(30) Foreign Application Priority Data

Aug. 17, 2011 (EP) .................................. 10176965

(51) Int. Cl.
G06F 9/445 (2006.01)
(52) U.S. Cl.
CPC ... G06F 8/65 (2013.01); G06F 8/61 (2013.01)

(58) Field of Classification Search
None
See application file for complete search history.

(56) References Cited

U.S. PATENT DOCUMENTS

| 2003/0221190 | A1 | 11/2003 | Deshpande et al. |
| 2004/0243995 | A1 | 12/2004 | Sheehy |
| 2005/0204353 | A1* | 9/2005 | Ji ................................ 717/168 |
| 2007/0150890 | A1 | 6/2007 | Shapiro |
| 2008/0114860 | A1 | 5/2008 | Keys et al. |

* cited by examiner

*Primary Examiner* — Chuck Kendall
(74) *Attorney, Agent, or Firm* — Novak Druce Connolly Bove + Quigg LLP

(57) ABSTRACT

A low or medium voltage electric power distribution network comprising: a plurality of P&C devices (IED1, IEDN), and a computerized station (11) which can communicate with said P&C devices through a communication network (12). Said computer station comprises first computerized means (111) for executing, according to a batch processing mode, downloading/uploading sessions of configuration/software upgrading data packages (F1, FN) to/from said P&C devices, said computerized means executing a plurality of processing threads during a downloading/uploading session of said configuration/software upgrading data packages, each of said processing threads being executed for performing the task of downloading/loading one or more configuration/software upgrading data packages to a selected P&C device in parallel and independent manner with respect to the other P&C devices.

19 Claims, 2 Drawing Sheets

LOW OR MEDIUM VOLTAGE ELECTRIC POWER DISTRIBUTION NETWORK

CROSS REFERENCE TO RELATED APPLICATIONS

Figure 1:
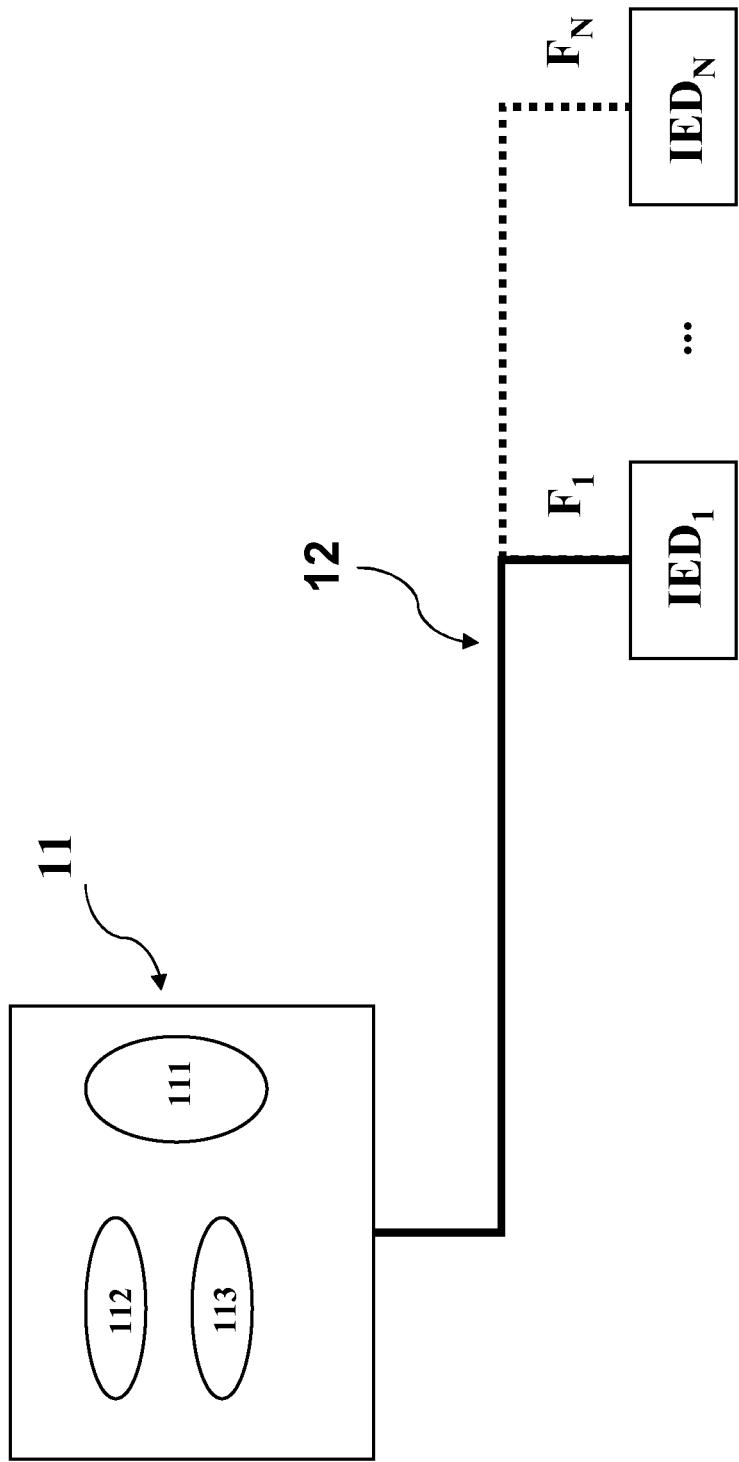

This application is a National Phase filing under 35 U.S.C. §371 of PCT/EP2011/064175 filed on Aug. 17, 2011; which claims priority to Application No. 10176965.1 filed in Europe on Sep. 15, 2010 under 35 U.S.C. §119; the entire contents of all are hereby incorporated by reference.

The present invention relates to a low or medium voltage power distribution network. Modern power distribution networks comprise protection and control (P&C) devices, also called Intelligent Electronic Device (IED). Such P&C devices are basically aimed at controlling the operations of the switch devices of the power distribution network, at collecting and providing information related to electrical quantities (voltage, current, power and the like) in certain points of the power distribution network and at implementing high level management functionalities of the power distribution networks.

P&C devices are usually connected to a communication network, e.g. an interbay bus, so that they can communicate and exchange data/information.

A P&C device generally comprises a processing unit, in which a software environment is loaded to support applications for performing the functionalities foreseen for the P&C device. Such a software environment needs to be configured when the P&C is installed. Also, maintenance interventions need to be performed from time to time, in which the software environment of the P&C is re-configured or upgraded to support new or different functionalities of the P&C device.

Upgrading of the software environment of the P&C is generally performed by loading on the P&C device proper configuration files.

Said configuration files are generally downloaded from a service computer that is temporarily connected to the P&C device via a serial cable in one-to-one connection.

As it is largely known, this operation is relatively slow, which fact becomes a relevant disadvantages when a large number of P&C devices need to re-configured as it happens in large power distribution networks.

The practice has shown how installation and maintenance interventions to configure, reconfigure, or upgrade the P&C devices of the network are quite time-spending activities to be carried out.

These problems are worsened by the fact that often P&C devices are installed in locations that are quite difficult to reach. Therefore, it may be difficult for an operator to establish a one-to-one connection with a P&C device, which may bring to a further loss of time or to errors in carrying out the reconfiguration intervention.

It is an object of the present invention to provide a low or medium voltage electric power distribution network that solves the above-mentioned problems.

More in particular, it is an object of the present invention to provide a low or medium voltage electric power distribution network in which the configuration/software upgrading of P&C devices can be carried out in an easy manner.

A further object of the present invention is to provide a low or medium voltage electric power distribution network in which the maintenance operations of the P&C devices are carried out in a reduced amount of time.

Another object of the present invention is to provide a low or medium voltage electric power distribution network in which the amount of maintenance operations work is reduced.

Yet another object of the present invention is to provide a low or medium voltage electric power distribution network, which can be easily managed and maintained and at competitive costs.

The present invention thus provides a low or medium voltage electric power distribution network comprising:
a plurality of P&C devices (IED1, IEDN),
a computerized station which can communicate with said P&C devices through a communication network;
characterized in that said computer station comprises first computerized means for executing, according to a batch processing mode, downloading/uploading sessions of configuration/software upgrading data packages (F1, FN) to/from said P&C devices, said computerized means executing a plurality of processing threads during a downloading/uploading session of said configuration/software upgrading data packages, each of said processing threads being executed for performing the task of downloading/uploading one or more configuration/software upgrading data packages to a selected P&C device in parallel and independent manner with respect to the other P&C devices.

As better explained in the following description, thanks to the accessibility to the P&C devices from remote, it is possible to reduce the amount of maintenance operations work for said P&C devices.

Also, by executing a plurality of processing threads during the downloading/uploading sessions of the configuration/software upgrading data packages, considerable time saving during maintenance operations is achieved.

Preferably, that said computerized station comprises second computerized means for selecting the configuration/software upgrading data packages to be downloaded/uploaded to/from one of said P&C devices.

In a further preferred embodiment of the invention, said computerized station comprises third computerized means for performing compatibility checks on the configuration/software upgrading data packages to be downloaded/uploaded to/from one of said P&C devices.

In a typical embodiment of the invention, each of said configuration/software upgrading data packages (F1, FN) comprises one or more configuration files and/or one or more upgrading software files.

Advantageously, said communication network is an Ethernet LAN. Use of other communication networks is also possible.

Figure 2:
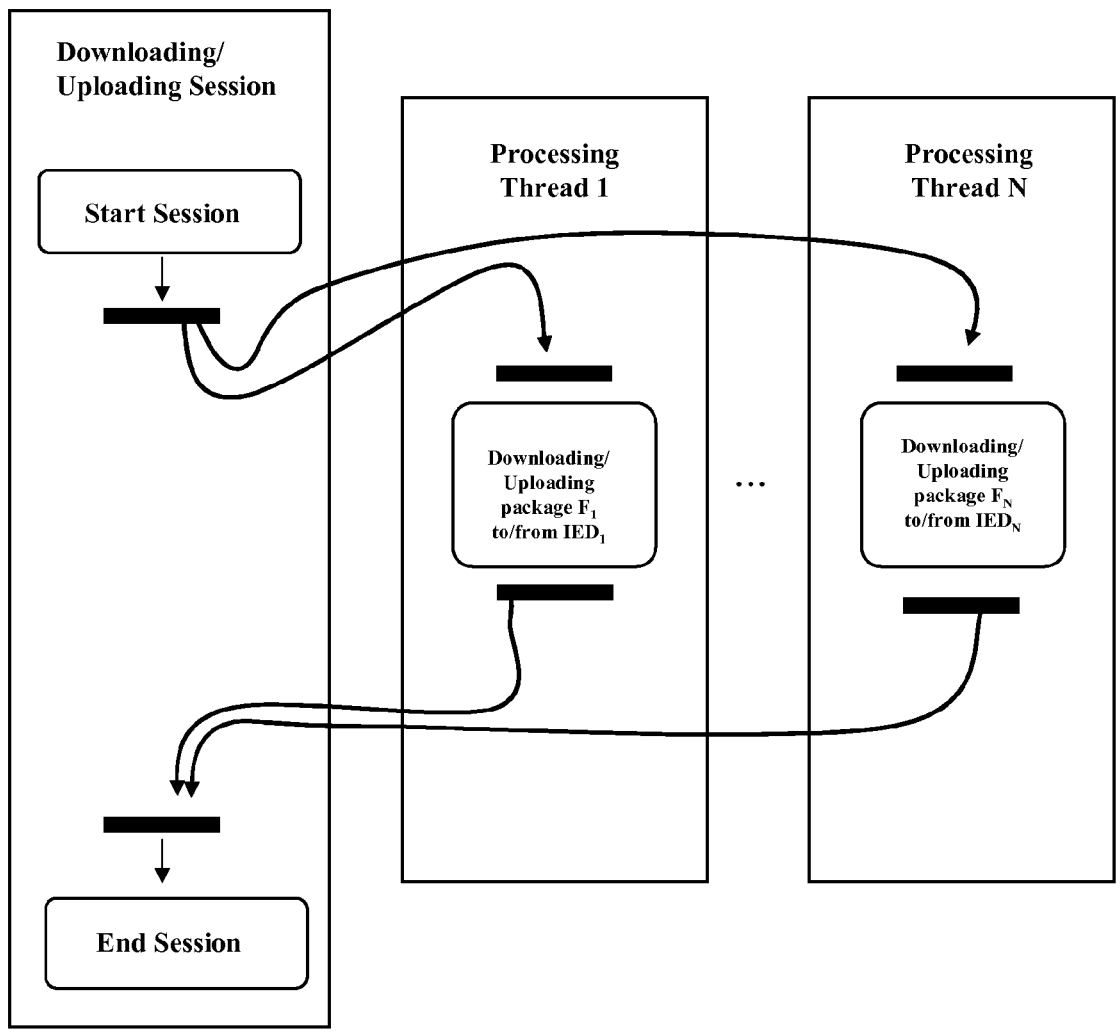

Further characteristics and advantages of the invention will emerge from the description of preferred, but not exclusive, embodiments of the low or medium voltage electric power distribution network, according to the invention, non-limiting examples of which are provided in the attached drawings, wherein:

FIG. 1 is a block scheme of an embodiment of the low or medium voltage electric power distribution network, according to the invention; and FIG. 2 is a scheme of the functioning of an embodiment of the low or medium voltage electric power distribution network, according to the invention.

Referring to the cited figures, a low or medium voltage electric power distribution network comprises, in its more general definition, a plurality of P&C devices (IED1, IEDN). As already said, P&C devices are basically aimed at performing a number of functions such as: controlling the operations of the switch devices of the power distribution network, collecting and providing information related to electrical quantities (voltage, current, and the like) in certain points of the power distribution network, and implementing high level management functionalities of the power distribution networks. P&C devices are well known in the art and will not be described in further details.

The low or medium voltage electric power distribution network of the invention further comprises a computerized station 11 which can communicate with said P&C devices through a communication network 12.

One of the characterizing features of the low or medium voltage electric power distribution network of the invention is that said computer station 11 comprises first computerized means 111 for executing, according to a batch processing mode, downloading/uploading sessions of configuration/software upgrading data packages (F1, FN) to/from said P&C devices (IED1, IEDN). As shown in FIG. 2, in the low or medium voltage electric power distribution network of the invention, said first computerized means 111 execute a plurality of processing threads during a downloading/uploading session of said configuration/software upgrading data packages (F1, FN), each of said processing threads being executed for performing the task of downloading/uploading one or more configuration and/or upgrading data packages to a selected P&C device in parallel and independent manner with respect to the other P&C devices (IED1, IEDN).

In practice, the core of the solution is to implement in the IED the capability to receive/send a new configuration file and/or receive a new software file via a communication port (for instance an Ethernet port) and overwrite and/or upgrade the old one in a safe manner. At the same time, said computer station 11, for instance a maintenance PC, is provided with a batch upload and download mechanism and/or with a batch upgrading mechanism for loading and sending configuration files and/or for sending a software file simultaneously to many IEDs via the communication network 12, which is preferably an Ethernet LAN.

In the low or medium voltage electric power distribution network of the invention, both the computer station 11, i.e. the maintenance PC, and all the IEDs are correctly configured in a LAN and they are able to communicate through TCP/IP protocol.

For the purposes of the present invention, batch upload and download is a form of batch processing used to load and send files to multiple IEDs in an automated fashion, in order to save time and reduce the amount of work involved. Similarly, batch upgrading is a form of batch processing used to send software to multiple IEDs in an automated fashion, in order to save time and reduce the amount of work involved.

In the case of batch upload and download, each IED (IED1, IEDN) receives from the maintenance PC 11 a specific configuration file related to the task to be performed by the IED itself (the IED may supervise or monitor or protect motors, feeders, incomings, etc.). In this way the configuration setup of all the IEDs composing a substation in the network is done by a single operation; similarly, the retrieve of all the configuration files can be done by the maintenance PC 11 in a single operation.

For practical purposes, the maintenance operator associates a configuration file to each IED (IED1, IEDN) and groups them under a hierarchical structure. The solution allows the maintenance operator to have the following off-line functionality:

handle a new concept of project, composed by substation nodes, voltage level nodes, bay nodes and finally IED nodes composing the substation plant. Each IED node is physically represented by its configuration file.

compare the properties of each IED configuration file in order to check correctness.

Only if the off-line check is without errors then the configuration upload and download in batch mode of a group or all IEDs can start.

Such solution is achieved by implementing in computer station 11 a multi-threading architecture in order to support many threads each running at the same time within the program and running "simultaneously".

The main flow of process creates for each IED (IED1, IEDN) a thread that is responsible to perform the unique task of loading the configuration file from the IED or sending the configuration file previously configured to its correspondent IED. This operation is made in parallel for all the devices independently each one to other.

When a thread ends its work then it sends a message to the main flow process to signal the operation result. The main flow ends the whole operation when all the threads have finished their session job.

The whole operation is conveniently showed to the operator by means of a progress bar during the session job and the result by means of status message for each IED (IED1, IEDN).

FIG. 2 gives a graphical representation of the process of uploading (or downloading) configuration files to many IEDs in the way explained above. As explained above, each file may be different to the others and is related to a specific IED device through the TCP/IP connection.

In the adopted model, multiple threads can exist within the context of the single main process. These threads are able to execute independently, sharing only the resources of the main process. The main execution flow and threads communicate through standard messages.

Similarly, in the case of software upgrading, the solution is achieved implementing in computer station 11 (e.g. a maintenance PC) a multi-threading architecture in order to support many threads each running at the same time within the program and running simultaneously.

In particular there is one thread for each IED (IED1, IEDN) in the network with the job to perform the unique task of sending software to its relevant IED (IED1, IEDN).

Conveniently, the computer station 11 before starting to send the software file knows all the IP addresses assigned to IEDs. Then, the operator selects the software file and starts the sending session.

The main flow of process creates for each IED (IED1, IEDN) a thread that is responsible to send the software file to its correspondent IED. This operation is made in parallel for all the devices independently each one to other.

When a thread ends its work then it sends a message to the main flow process to signal the operation result. Then, the main flow ends the whole operation when all the threads have finished their session download.

Finally, the result is shown to the operator for each IED. Conveniently, the whole operation can be showed to the operator by means of a progress bar during the sending session and the result by means of status message for each IED.

FIG. 2 gives a graphical representation also of the process of sending a software file to many IEDs in the way explained above. In the adopted model multiple threads can exist within the context of the single main process.

These threads are able to execute independently sharing only the resources of the main process. The main execution flow and threads communicate through standard messages.

In order to carry out the above, said computerized station 11 preferably comprises second computerized means 112 for selecting the configuration and/or software upgrading data packages to be downloaded/uploaded to/from one of said P&C devices.

According to a further preferred embodiment of a low or medium voltage distribution network of the invention, said computerized station 11 conveniently comprises third computerized means 113 for performing compatibility checks on the configuration/software upgrading data packages to be downloaded/uploaded to/from one of said P&C devices.

As it can be appreciated from the above description and the cited figures, in the low or medium voltage distribution network of the invention, thanks to the accessibility to the P&C devices (IED1, IEDN) from remote, i.e. form the computer station 11, it is possible to reduce the amount of maintenance operations work for said P&C devices.

Also, the multi-threading architecture allows to execute a plurality of processing threads during the downloading/uploading sessions of the configuration/software upgrading data packages, thereby achieving considerable time saving during maintenance operations.

The low or medium voltage distribution network thus conceived may undergo numerous modifications and come in several variants, all coming within the scope of the inventive concept. Moreover, all the component parts described herein may be substituted by other, technically equivalent elements. In practice, the component materials and dimensions of the device may be of any nature, according to need and the state of the art.

The invention claimed is:

1. A low or medium voltage electric power distribution network comprising:
   a plurality of protection and control ("P&C devices") ($IED_1$, $IED_N$) configured to control switches of the power distribution network,
   a computerized station which can communicate with said P&C devices through a communication network;
   wherein said computer station comprises first computerised means for executing, according to a batch processing mode, downloading/uploading sessions of configuration/software upgrading data packages ($F_1$, $F_N$) to/from said P&C devices, said computerised means executing main process flow comprising a plurality of processing threads during a downloading/uploading session of said configuration/software upgrading data packages, each of said processing threads being executed for performing the unique task of downloading/loading one or more configuration/software upgrading data packages to a selected P&C device in parallel and independent manner with respect to the other P&C devices;
   wherein each individual processing thread signals said main process flow when said each individual processing thread completes its session;
   wherein said main process flow ends operation when it receives signals from all the processing threads that all of the sessions are completed.

2. A low or medium voltage distribution network, according to claim 1, wherein said computerised station comprises second computerised means for selecting the configuration/software upgrading data packages to be downloaded/uploaded to/from one of said P&C devices.

3. A low or medium voltage distribution network, according to claim 1, wherein said computerised station comprises third computerised means for performing compatibility checks on the configuration/software upgrading data packages to be downloaded/uploaded to/from one of said P&C devices.

4. A low or medium voltage distribution network, according to claim 1, wherein each of said configuration/software upgrading data packages ($F_1$, $F_N$) comprises one or more configuration files.

5. A low or medium voltage distribution network, according to claim 1, wherein each of said configuration/software upgrading data packages ($F_1$, $F_N$) comprises one software file.

6. A low or medium voltage distribution network, according to claim 1, wherein said communication network is an Ethernet LAN.

7. A low or medium voltage distribution network, according to claim 2, wherein said computerised station comprises third computerised or performing compatibility checks on the configuration/software upgrading data packages to be downloaded/uploaded to/from one of said P&C devices.

8. A low or medium voltage distribution network, according to claim 7, wherein each of said configuration/software upgrading data packages ($F_1$, $F_N$) comprises one or more configuration files.

9. A low or medium voltage distribution network, according to claim 2, wherein each of said configuration/software upgrading data packages ($F_1$, $F_N$) comprises one or more configuration files.

10. A low or medium voltage distribution network, according to claim 3, wherein each of said configuration/software upgrading data packages ($F_1$, $F_N$) comprises one or more configuration files.

11. A low or medium voltage distribution network, according to claim 2, wherein each of said configuration/software upgrading data packages ($F_1$, $F_N$) comprises one software file.

12. A low or medium voltage distribution network, according to claim 3, wherein each of said configuration/software upgrading data packages ($F_1$, $F_N$) comprises one software file.

13. A low or medium voltage distribution network, according to claim 4, wherein each of said configuration/software upgrading data packages ($F_1$, $F_N$) comprises one software file.

14. A low or medium voltage distribution network, according to claim 7, wherein each of said configuration/software upgrading data packages ($F_1$, $F_N$) comprises one software file.

15. A low or medium voltage distribution network, according to claim 8, wherein each of said configuration/software upgrading data packages ($F_1$, $F_N$) comprises one software file.

16. A low or medium voltage distribution network, according to claim 9, wherein each of said configuration/software upgrading data packages ($F_1$, $F_N$) comprises one software file.

17. A low or medium voltage distribution network, according to claim 10, wherein each of said configuration/software upgrading data packages ($F_1$, $F_N$) comprises one software file.

18. A low or medium voltage distribution network, according to claim 2, wherein said communication network is an Ethernet LAN.

19. A low or medium voltage distribution network, according to claim 3, wherein said communication network is an Ethernet LAN.

* * * * *